US007437693B1

(12) United States Patent
Somaya et al.

(10) Patent No.: US 7,437,693 B1
(45) Date of Patent: Oct. 14, 2008

(54) METHOD AND SYSTEM FOR S-PARAMETER GENERATION

(75) Inventors: Nitin Ramchand Somaya, Nashua, NH (US); Shu Ye, North Chelmsford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 30 days.

(21) Appl. No.: 11/096,909

(22) Filed: Mar. 31, 2005

(51) Int. Cl.
G06F 17/50 (2006.01)
(52) U.S. Cl. ............... 716/4; 716/1; 716/5; 716/18
(58) Field of Classification Search ............... 716/1, 716/3, 18, 4, 5; 703/1, 3, 13–22
See application file for complete search history.

(56) References Cited

U.S. PATENT DOCUMENTS

| 6,266,629 B1* | 7/2001 | Mallavarpu et al. | 703/13 |
|---|---|---|---|
| 6,560,567 B1* | 5/2003 | Yechuri | 703/2 |
| 6,618,837 B1* | 9/2003 | Zhang et al. | 716/4 |
| 6,850,871 B1* | 2/2005 | Barford et al. | 703/2 |
| 6,909,978 B2* | 6/2005 | Bostoen et al. | 702/65 |
| 7,038,468 B2* | 5/2006 | Verspecht | 324/638 |
| 2003/0065498 A1* | 4/2003 | Bois et al. | 703/19 |
| 2004/0243373 A1* | 12/2004 | Sercu et al. | 703/14 |

OTHER PUBLICATIONS

Corey et al., Automatic Netlist Extraction for Measurement-Based Characterization of Off-Chip Interconnect, 1996, IEEE, pp. 1-6.*
Liao et al., S-Parameter Based Macro Model of Distributed-Lump Networks Using Exponentially Decayed Polynomial Function, 1993, ACM, pp. 726-731.*
Yang et al., Modeling and Simulation of High-Frequency Integrated Circuits Based on Scattering Parameters, 1991, ACM, pp. 752-757.*
Formo et al., Advanced Simulation and Modeling Techniques for Hardware Quality Verification of Digital Systems, 1994, ACM, pp. 122-127.*
Agilent Technologies "Large-Signal S-Parameter Simulation" Dec. 2003, Title page, Copyright page, Table of Contents, Index, 16 pgs., Agilent Technologies, Palo Alto, CA.

(Continued)

*Primary Examiner*—Jack Chiang
*Assistant Examiner*—Nghia M Doan
(74) *Attorney, Agent, or Firm*—Vista IP Law Group LLP

(57) ABSTRACT

Disclosed are methods and systems for generating S-parameters. In some embodiments, the methods and systems comprise creating (e.g., extracting, calculating, generating), in part or whole into the development environment, S-parameters of the given netlist, which may be represented in part or whole by S-parameters. This is useful in data abstraction, topology complexity reduction, or data hiding. Some embodiments provide convenient and automated approaches for what is normally a complicated and laborious process. Some embodiments provide the ability to generate S-parameters for the specified part or whole topology netlist. Ports can be specified at any node in the topology. Non-linear devices, e.g., IBIS buffers, diodes, non-linear terminations, can be automatically excluded from generated S-parameter model. Additionally, adding the device package models is an available option. Once generated, S-parameter models can be automatically replaced by the original part or whole topology with a Black Box and the original connections are maintained.

16 Claims, 9 Drawing Sheets

OTHER PUBLICATIONS

Agilent Technologies "S-Parameter Simulation" Dec. 2003, Title page, Copyright page, Table of Contents, Index, 32 pgs., Agilent Technologies, Palo Alto, CA.

Aydin, K. et al. "Dual-Polarization Radar Measurements and Modeling of Ice Crystals at 95 GHz" Proceedings of the IEEE International Geoscience and Remote Sensing Symposium (IGARRS 2000), Honolulu, HI, Jul. 24-28, 2000, vol. 4, pp. 1587-1589.

Celik, M. et al. "A New Moment Generation Technique for Interconnects Characterized by Measured or Calculated S-Parameters" Proceedings of the IEEE Multi-Chip Module Conference (MCMC '96), Feb. 6-7, 1996, pp. 196-201.

Cherry, P.C. et al. "Obtaining High-Performance Time-Domain Characteristics from Calculated S-Parameters for Various Electronic Package and Interconnection Structures" Proceedings of the 1995 IEEE Antennas and Propagation Society International Symposium, Newport Beach, CA, Jun. 18-23, 1995, vol. 1, pp. 224-227.

Ingelstrom, P. et al. "Goal-Oriented Error-Estimation for S-Parameter Computation" IEEE Transactions on Magnetics, Mar. 2004, vol. 40, No. 2, pp. 1432-1435.

van Rienen, U. et al. "RF Computations with the Finite Integration Technique (FIT) and the Coupled S-Parameter Calculation (CSC)" Proceedings of the 2003 IEEE Antennas and Propagation Society International Symposium, Jun. 22-27, 2003, vol. 2, pp. 980-983.

Ye, X. et al. "Incorporating Two-Port Networks with S-Parameters into FDTD" IEEE Microwave and Wireless Components Letters, Feb. 2001, vol. 11, No. 2, pp. 77-79.

* cited by examiner

```
┌─────────────────────────────────────────────────────────────────────┐
│                    S-Parameter Generation Log                        │
├─────────────────────────────────────────────────────────────────────┤
│  File    Close    Help                                               │
├─────────────────────────────────────────────────────────────────────┤
**********************************************************************
                       S-Parameter Generation Log Log File:      /hm/shuy/15.5/s-creation/develop/enhance/sigxp_sparamgen_report.log
Topology File: /hm/shuy/15.5/s-creation/develop/enhance/testcase1.top
Created Date:  Oct 16 17:28:15 2003
**********************************************************************

----------------------------------------------------------------------
S-Parameter Generation SUCCEEDED. The following files have been created:
----------------------------------------------------------------------

Touchstone File:      /hm/shuy/15.5/s-creation/develop/enhance/test1.s2p
Device Model Library: /hm/shuy/15.5/s-creation/develop/enhance/devices.dml
Backup Topology:      /hm/shuy/15.5/s-creation/develop/enhance/test1.top ----------------------------------------------------------------------
S-Parameter Generation Information(from tlsim.log)
----------------------------------------------------------------------

**** ac matrix size = 9 ****

~ End of Log ~
```

Fig. 3

```
("devices.dml"
    (PackagedDevice
        (abc
        (ESpice ".subckt abc DOUTP1_2 DINP1_2 DOUTP1_3 DINP1_3
        * The SPARAM subckt is encapsulated inside the outer subckt to allow
        * the user to control the locations of the black box symbol terminals
        * in the SigXP canvas without altering the SPARAM data order.
        X4Port DOUTP1_2 DINP1_2 DOUTP1_3 DINP1_3 4Port_Data
        .subckt 4Port_Data 1 2 3 4
        S1 1 2 3 4 algorithm=default
        DATAPOINTS SPARAM
        R=50.000000 * If R is missing the default is 50.0
        * The allowed data units are [HZ,KHZ,MHZ,GHZ]
        DATAUNIT=HZ * If DATAUNIT is missing the default is HZ
        * Note that the R and DATAUNIT statements should proceed the datapoints.
        * Each data point is in the real-imaginary format.
        FREQUENCY=1.000000e+00
        7.271188e-02 -5.149308e-06 9.272840e-01 -5.200416e-06 5.078344e-11 2.292596e-06
        5.099521e-11 2.296828e-06
        9.272840e-01 -5.200416e-06 7.271200e-02 -5.164703e-06 5.102161e-11 2.297982e-06
        5.122968e-11 2.317782e-06
        5.079589e-11 2.292688e-06 5.103456e-11 2.297890e-06 7.249369e-02 -5.151745e-06
        9.275022e-01 -5.200457e-06
        5.100867e-11 2.296736e-06 5.124382e-11 2.317874e-06 9.275022e-01 -5.200457e-06
        7.249381e-02 -5.162083e-06
        FREQUENCY=3.000000e+07
        -2.447871e-02 -7.709257e-03 -1.440644e-01 -8.878593e-01 3.037080e-02 -5.119359e-03 -
        6.200911e-04 -1.559595e-03
        -1.446536e-01 -8.913145e-01 -2.894385e-02 -5.149724e-03 -1.194264e-03 -5.026655e-03
        3.129524e-02 6.432334e-04
        3.220316e-02 -3.453300e-03 -2.402177e-03 -3.294760e-03 -2.309263e-02 -6.229656e-03 -
        1.440022e-01 -8.901010e-01
        -2.351684e-03 -3.241668e-03 3.249148e-02 -1.099993e-03 -1.439408e-01 -8.900640e-01 -
        2.770884e-02 -6.814076e-03
        END SPARAM
        .ends 4Port_Data
        .ends abc" )
        (PinConnections
            (DOUTP1_2 DINP1_2 )
            (DOUTP1_2 DOUTP1_3 )
            (DOUTP1_2 DINP1_3 )
            (DINP1_2 DOUTP1_2 )
            (DINP1_2 DOUTP1_3 )
            (DINP1_2 DINP1_3 )
            (DOUTP1_3 DOUTP1_2 )
            (DOUTP1_3 DINP1_2 )
            (DOUTP1_3 DINP1_3 )
            (DINP1_3 DOUTP1_2 )
            (DINP1_3 DINP1_2 )
            (DINP1_3 DOUTP1_3 ) )
        (NumberOfPorts 4 )
        (SubType SPARAM ) ) )
    (LibraryVersion 136.2 ) )
```

Fig. 8

METHOD AND SYSTEM FOR S-PARAMETER GENERATION

BACKGROUND

Linear networks, or certain types of non-linear networks such as those operating with sufficiently small signals, can be characterized by parameters measured at network terminals (ports). Parameters that are often used in circuit design to characterized a network are Scattering Parameters (or "s-parameters").

S-parameters are the reflection and transmission coefficients between the incident and reflection waves. They describe completely the behavior of a device under linear conditions at microwave frequency range. Each parameter is typically characterized by magnitude, decibel and phase.

During the signal integrity analysis of electrical systems, e.g., digital PCB systems, it is often necessary to solve the s-parameter description of the circuit (i.e., interconnect and discrete elements). Some reasons to solve for the s-parameter description is to correlate with lab measurements, to have a condensed/simpler representation of a large structure to share among design teams and simulations, to achieve faster simulation in both TD and FD because the interconnect is largely pre-solved, and to generate the data to place into the s-parameter black box models for TD and/or FD simulation It is often difficult to define the correct parameters for generating S parameters, and then to include them back into an appropriate topology format. In conventional approaches, this is a manual, difficult, and very labor-intensive process. The process is also very time-consuming and prone to errors.

One approach to address this handles parts of the problem as either point tools or provided functionality that cannot be directly used to solve the above defined problem in one single flow. None of the tools currently available in the digital PCB design and analysis industry provide any such functionality in any solution of their solutions.

SUMMARY

Disclosed is an improved method and system for generating S-parameters. In some embodiments, the disclosed approach incorporates the process of creating (e.g., extracting, calculating, generating) S-parameters of the given netlist in part or whole, into the development environment. The topology netlist can be represented by S-parameters in part or whole. This is useful for the process of data abstraction, topology complexity reduction or data hiding. Some embodiments provide a highly convenient and automated approach for what is normally a very complicated and a laborious process.

Some embodiments provide the ability to generate S-parameters for the specified part or whole topology netlist. Ports can be specified at any node in the topology. Non-linear devices such as IBIS buffers, diodes, non-linear terminations can be automatically excluded from generated S-parameter model. Additionally, the option of adding the device package models is available. Once generated, the S-parameter model can be automatically replaced by the original part or whole topology with a Black Box and the original connections are maintained.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The accompanying drawings are included to provide a further understanding of the invention and, together with the Detailed Description, serve to explain the principles of the invention.

FIG. 3 illustrates an example S-parameter generation log.

FIG. 8 shows an example of s-parameters.

DETAILED DESCRIPTION

Disclosed is an improved method and system for generating S-parameters. In some embodiments, the disclosed approach incorporates the process of creating (e.g., extracting, calculating, generating) S-parameters of the given netlist in part or whole, into the development environment. The topology netlist can be represented by S-parameters in part or whole. This is useful for the process of data abstraction, topology complexity reduction or data hiding. Some embodiments provide a highly convenient and automated approach for what is normally a very complicated and a laborious process.

Embodiments of the invention provide the ability to generate S-parameters for the specified part or whole topology netlist. Ports can be specified at any node in the topology. Non-linear devices such as IBIS buffers, diodes, non-linear terminations can be automatically excluded from generated S-parameter model. Additionally, device package models can be added.

In some embodiments, the output of s-parameter generation process is not only be in the form of model data, but also in the form of a topology element that can be placed and analyzed like any other discrete element. This topology element or S-parameter "black box" can be a) directly used in other topologies, b) exported as raw data tables, and/or c) plotted on a plotting tool. This functionality will not generally solve s-parameters for non-linear devices; however, it should handle non-linear devices and active devices in the topology accurately and appropriately. Therefore, once generated, the S-parameter model can be automatically replaced by the original part or whole topology with a Black Box and the original connections are maintained.

While certain examples disclosed herein are illustrated with respect to the digital PCB design process, it is noted that the invention may be applied to a much greater range of practical applications. As just a short list of examples, the invention may be applied to other processes such as Analog RF IC design and digital IC design.

Figure 1:
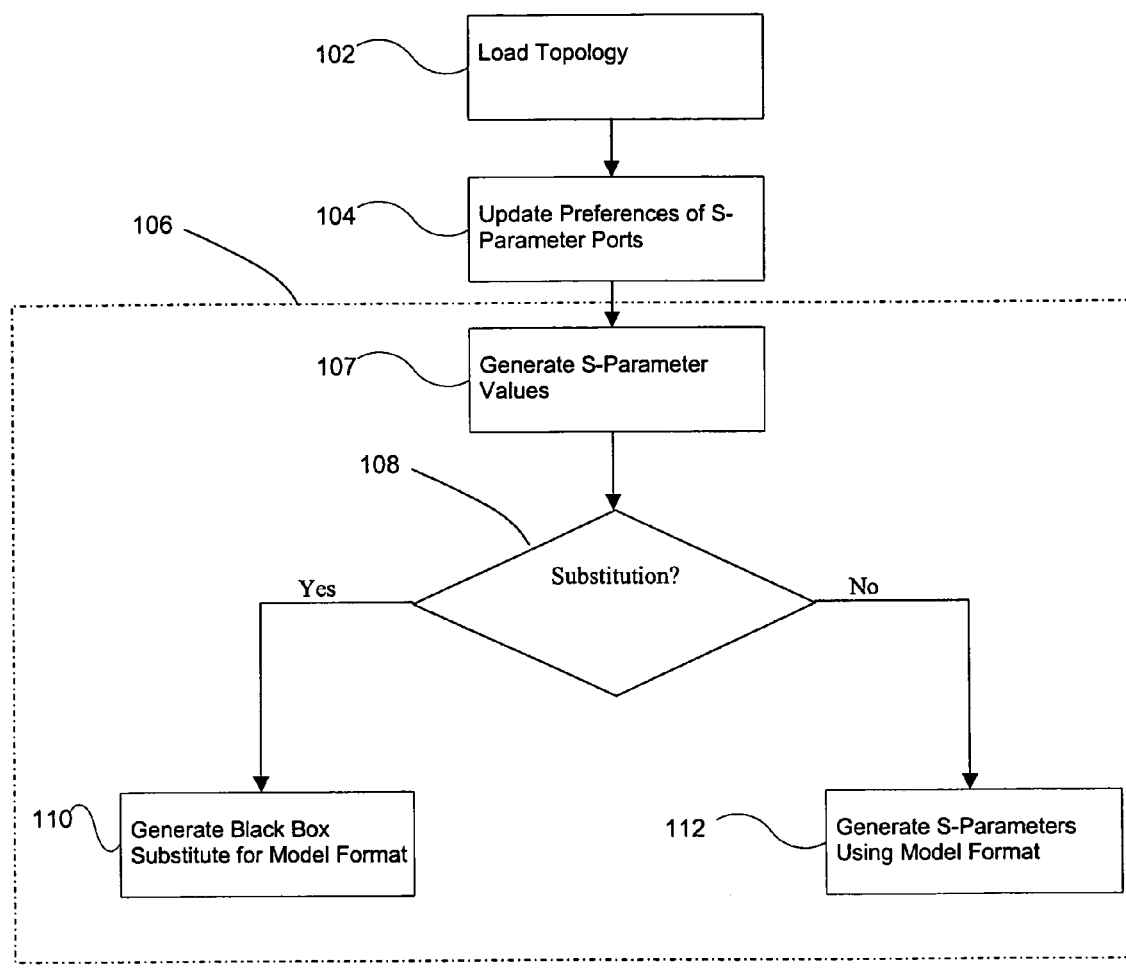
FIG. 1 shows a flow diagram of a process for utilizing S-parameters according to some embodiments of the invention.

FIG. 1 shows a high-level flowchart of a process for generating S-parameters according to an embodiment of the invention. At 102, the topology, i.e., electrical network, for the design is loaded. Any suitable tool or process for loading a given topology may be employed to implement action 102.

Given the loaded topology, the preferences of the S-Parameters ports are defined or updated at 104. More details regarding a process and system for defining/updating port parameters are provided below in conjunction with the description of FIG. 2.

At action 106, the S-Parameter values are generated based upon the defined/updated port settings. The process to automatically generate S-parameters is initiated at 107. A determination is made at 108 whether "substitution" is to be performed.

If substitution is not performed, then the S-Parameters are generated using a defined model format (112). Examples of suitable model formats include the touchstone format and the DML format. The touchstone format was developed for the ADS product. Unlike the touchstone format, the DML format can store port details along with model information. The touchstone format cannot be directly loaded into a topology without performing additional actions to provide correct mappings. Moreover, the touchstone is typically generated without port number information. Thus, the DML format is considered to be more suitable than the touchstone format for automatically updatable libraries.

If substitution is performed, then a black box substitute is generated for the model format (110). This action substitutes a black box that corresponds to elements in a portion of a design.

Port Definition and User Interface

Figure 2:
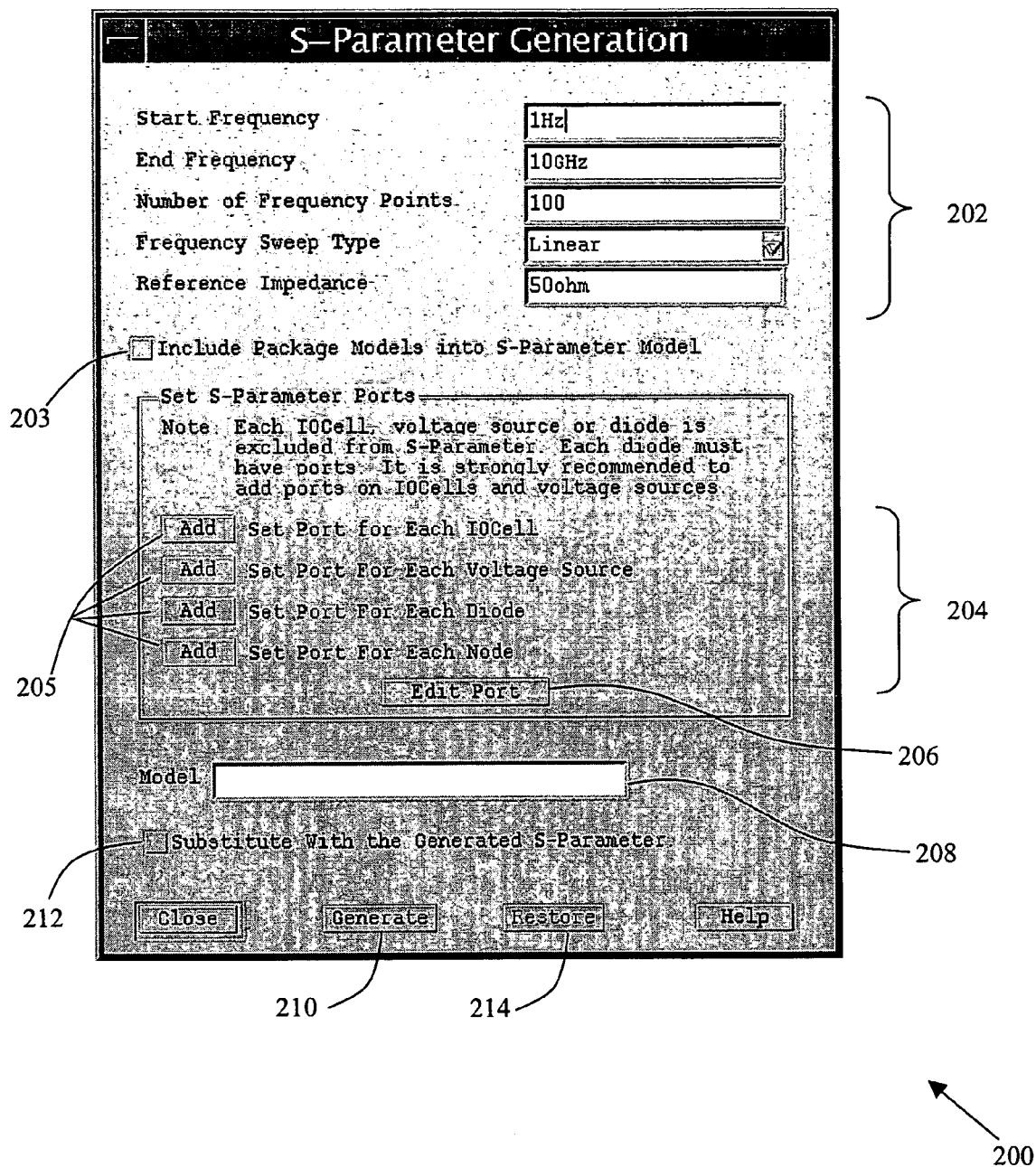
FIG. 2 illustrates a user interface for setting, defining, or modifying port parameters according to some embodiments of the invention.

FIG. 2 illustrates an embodiment of a user interface 200 that can be employed to perform action 104 of FIG. 1 to define or update the S-Parameter ports. Section 202 of user interface 200 includes interface components to set preference parameters.

The "Start Frequency/End Frequency" sections in user interface 200 are used to enter values to specify the frequency range. In some embodiments, the "Start Frequency" field must be less than the "End Frequency" field. In some embodiments, the default value for "Start Frequency" field is 1 Hz and the default value for "End Frequency" field is 10 GHz.

The "Number of Frequency Points" section allows the user to choose the number of points used between "Start Frequency" and "End Frequency". In some embodiments, the default value for this field is 100.

The "Frequency Sweep Type" field helps the user (e.g., using a pull down menu) to select a specific frequency sweeping algorithm. Examples of such algorithms include Linear and Logarithmic algorithms.

The Reference Impedance field allows the user to set the Normalizing Impedance for the output S-Parameters. In some embodiments, the default value for this field is 50 ohm.

The interface component 203 identified as "Include Package Models into S-Parameter Model" in FIG. 2 is used if the topology contains package models. In the present process, after S-Parameter generation, a S-Parameter model will include those package models. In some embodiments.

Section 204 of user interface 200 provides interface components to set S-Parameter ports.

The user can use "Add" button 205 to generate ports automatically or use the "Edit port" button 206 go to "Port-Editing" form to manually set ports one by one. Since drivers, receivers, diodes, voltage sources, terminators which contains voltage sources or diodes, and any other non-linear active devices are exclusive from the S-Parameter black box, each of these nodes becomes a node in the derived black box and connects to a port of S-Parameter black box.

As noted above, in some embodiments, ports can be automatically added to components of the design. With respect to the user interface 200, the "Set Port for Each IOCell" interface component automatically add ports on each pin of all IOCells in the opened topology on an EDA tool (e.g., SIGXP) canvas. The "Set Port for Each Voltage Source" interface component automatically add ports for each voltage source of the topology on the EDA tool canvas. If a termination contains voltage sources in it, a port will be added for that terminator as well once the user clicks "Add" to Set Port for Each Voltage Source. The "Set Port for Each Diode" interface component automatically add ports for each diode or diode termination of the topology in an EDA tool canvas. If a termination contains diodes in it, a port will be added for that terminator as well. If a topology contains diodes, ports are set before S-Parameter generation. The "Set Port for Each Node" interface component automatically add ports for each node of the topology on the EDA tool canvas. The "Edit Port" interface component 206 initiates a "Port-Editing" form to allow the user to manually edit a port.

The "Model" input text field 208 allows inputting of an S-Parameter model name to store S-Parameter Touchstone model data and ESPICE model data. In some embodiments, a backup topology will saved with that name after the user clicks "Generate" button. The Touchstone file, ESpice model data and backup topology file will be written in the current working directory. After the generation action is initiated (e.g., via the "Generate" button 210), some embodiments will generate an ESPICE model <modelName> into working device library file. In addition, the process writes a file in Touchstone format and write a back up topology file.

The topology on the EDA tool canvas can be updated and the generated S-Parameter black box placed according to the port setting. This can be initiated by activating the "Substitute with the Generated S-Parameter" interface component 212. Otherwise the topology on EDA tool canvas remains unchanged.

To generate the S-Parameters (e.g., by activating interface component 210), the S-Parameter black box touchstone and dml data will be generated, a backup topology will be saved, and a wave form will be brought up to show S-Parameter model data. If there is no defined port, or there is any missing model, or disconnected part(s) exist in the topology, an error message will be displayed and S-Parameter generation will abort. If any parameter value in a topology is represented by range, list, or expression, it means this parameter is sweepable and this topology contains a sweeping case. The tool will find more than one S-Parameter model that can be generated, then an error message will be displayed and generation procedure will abort if a sweeping case is not handled.

A log file, e.g., as shown in FIG. 3, can be generated to provide information about the S-Parameter generation process. These logged messages can be used to provide the user with proper details about the S-parameter generation process.

If it is desired to restore to the previous topology, the newly updated topology can be discarded by rolling back any changes to a previous version of the topology, e.g., by activating interface component 214.

For the sweeping case, a number of S-Parameter model files will be generated. The default file names are based on the file name provided in the "File" field. In case of file name conflicts with other files under the same directory, a different name will be used. After S-Parameter models are created for the sweeping case, those models are sweepable for the S-Parameter box.

Once the user clicks "Generate", a confirmer with sweep count will be brought up to ask the user if S-Parameter process will be continued or canceled. The present embodiment will implement sweeping cases for S-Parameter generation if a clear solution is found and flow to support it. Note that any implementation of swept parameters could capture the parameter's value within the S-Parameter file as a comment.

S-Parameter Black Boxes

Figure 4:
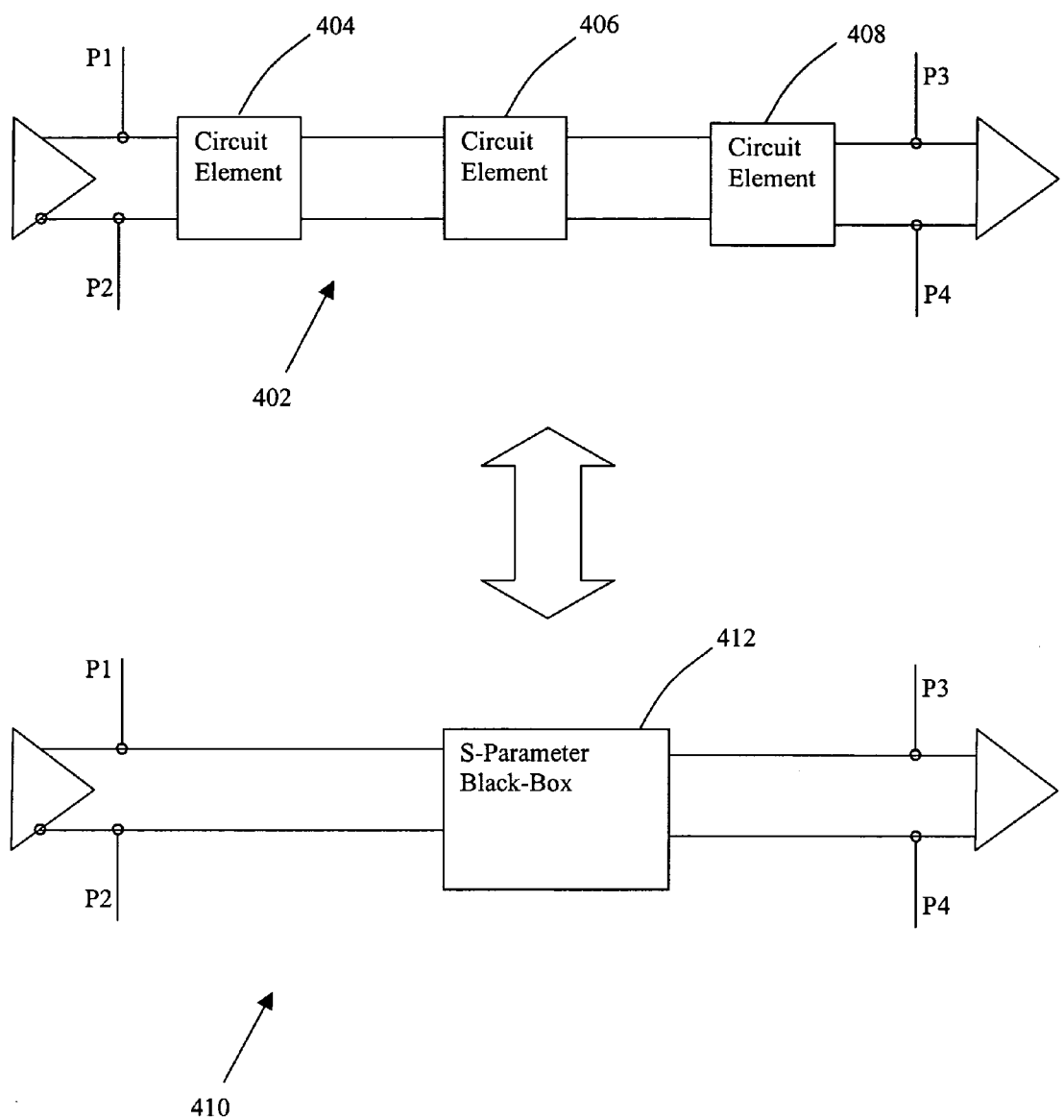
FIG. 4 shows an example s-parameter black box.

To explain black box substitutes, reference is now made to the illustrated example of FIG. 4. Assume that it is desired to characterize S-Parameters as a 4-port model. The original model 402 may include three circuit elements 404, 406, and 408. The substitution process takes any number of circuit elements and creates a black box that corresponds to those elements. In this example, the black box substitute 410 includes a black box 412 that corresponds to circuit elements 404, 406, and 408.

One advantage of using a black box substitute is that simulation can be performed using the black box. In some embodiment, the EDA tool can go back and forth between the original model and the black box substitute model. The idea is to characterize all behavior in a single black box.

Figure 5:
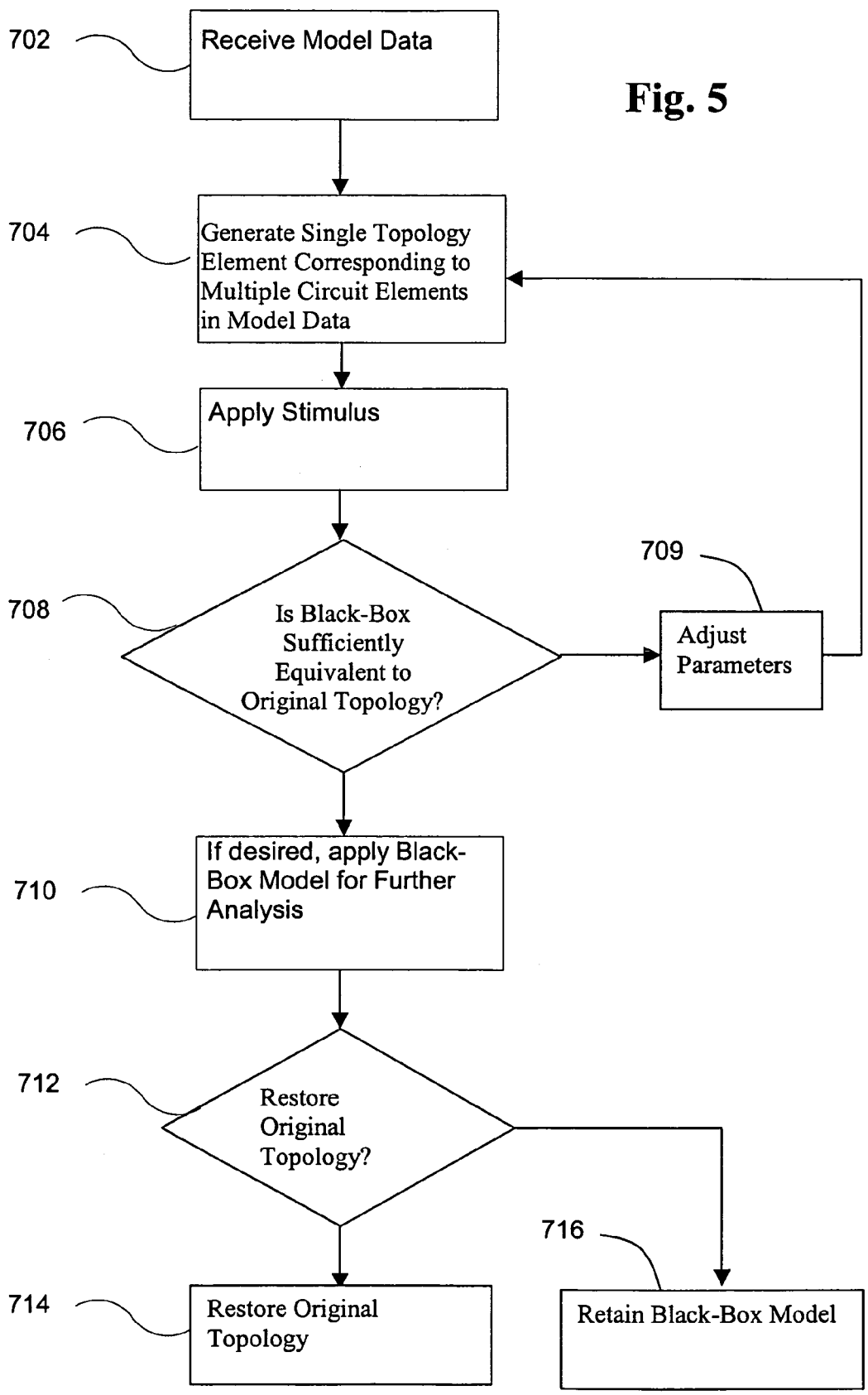
FIG. 5 shows a flow diagram of a process for utilizing s-parameter black boxes according to some embodiments of the invention.

FIG. 5 shows a flowchart of a process to use and create the black box models for analysis. At 702, the model data is received by the present embodiment of the invention. At 704, a single topology element (black box) is generated which corresponds to multiple circuit elements in the model data. Suitable approaches for generating the single topology element are described in C. R. Paul, *Analysis of Multiconductor Transmission Lines*, New York: Wiley-Interscience, 1994, pp. 186-246, W. R. Eisenstadt and Y. Eo, "S-parameter IC interconnect transmission line characterization", *IEEE transactions on components, hybrids and manufacturing tech*, vol. 15, no. 4, August 1992, and Winkle, T. M. and Dutta, L. S., "An Accurate and Complete Frequency Dependent Transmission Line Characterization Using S-Parameter", *Electrical Performance of Electronic Packaging*, 25-27 Oct. 1999, each of which are hereby incorporated by reference in their entirety.

To check on the accuracy level of the black box substitute, the same stimulus can be applied to both the original model and the black box to check for appropriate similarity and correlation between the two sets of results (706).

In one embodiment, an "undo" operation can be performed to roll back the creation of the black box without reloading the entire topology. This action is enabled by preserving the state of the data as of the time of receiving the model data. If it is desired to undo the operation, then the data created for the new black box is rolled back by restoring the prior state of the data as of the earlier state of the system. Any suitable approach for logging and restoring the state of data in a computing system may be used to implement this action, e.g., such as conventional restore operations used in database systems.

If the correlation between the original model data and the black box substitute is not sufficient, then the undo operation is performed, parameters changed (709), and another black box substitute is generated (704) and checked again (706, 708). This process can go back and forth until an acceptable black box substitute has been generated.

This process of creating and checking for a suitable black box substitute can be performed either manually or automatically. If done automatically, certain thresholds can be established to constrain the automatic nature of the operation. For example, a threshold level of correspondence can be established at which the black box substitute is found to be acceptable. In addition, a threshold number of attempts or cycles may be established to attempt to find a suitable black box substitute.

If desired, the black box model is used for further analysis (710), as described in more detail below. Once the analysis has been completed, a determination is made whether to restore the original topology (712). If desired, the original topology is restored at 714. Otherwise, the process retains the black box model (716).

Figure 6:
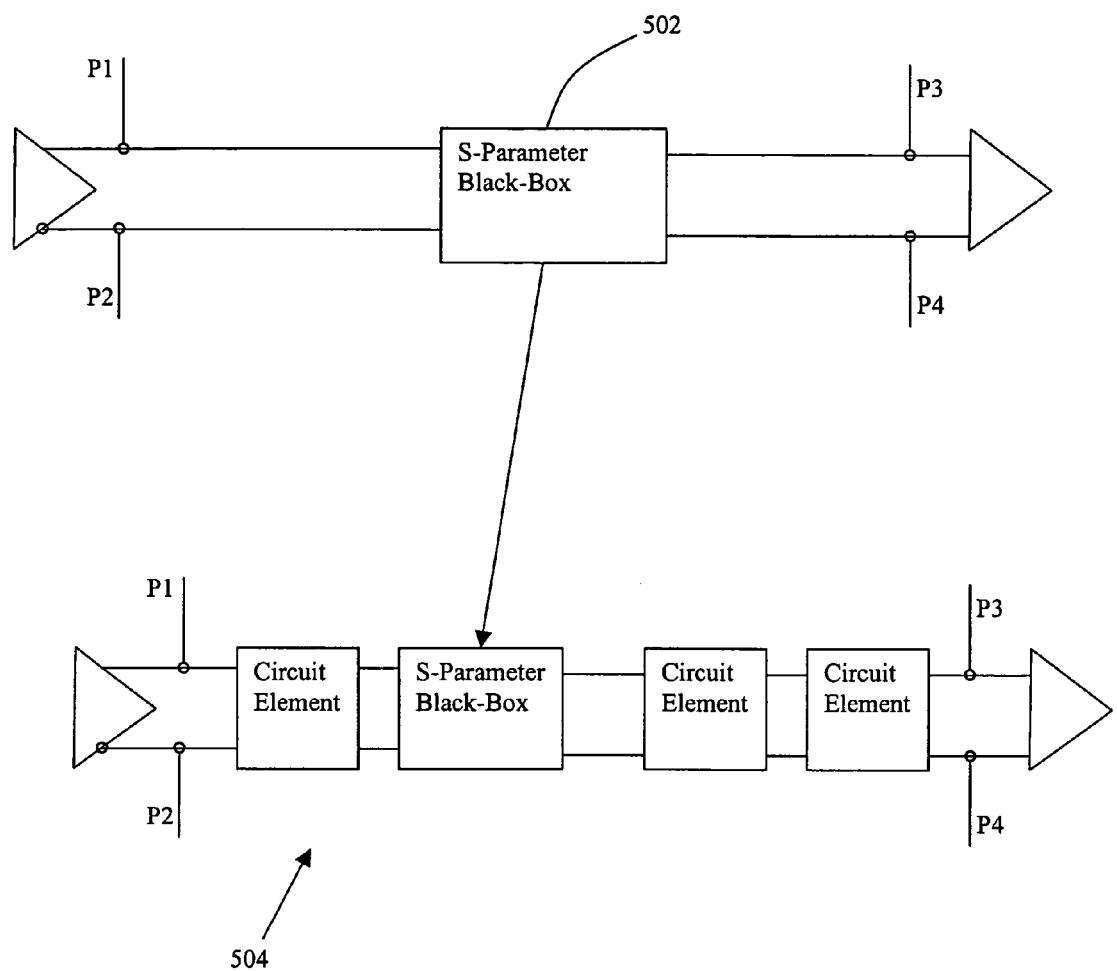
FIG. 6 shows an example of a nested s-parameter black box.

The black box models can be nested and placed into other portions of the design. Consider the illustrated example of FIG. 6. Here, a black box substitute 502 is embedded as a circuit element within a larger model 504.

S-Parameter Generation

Figure 7:
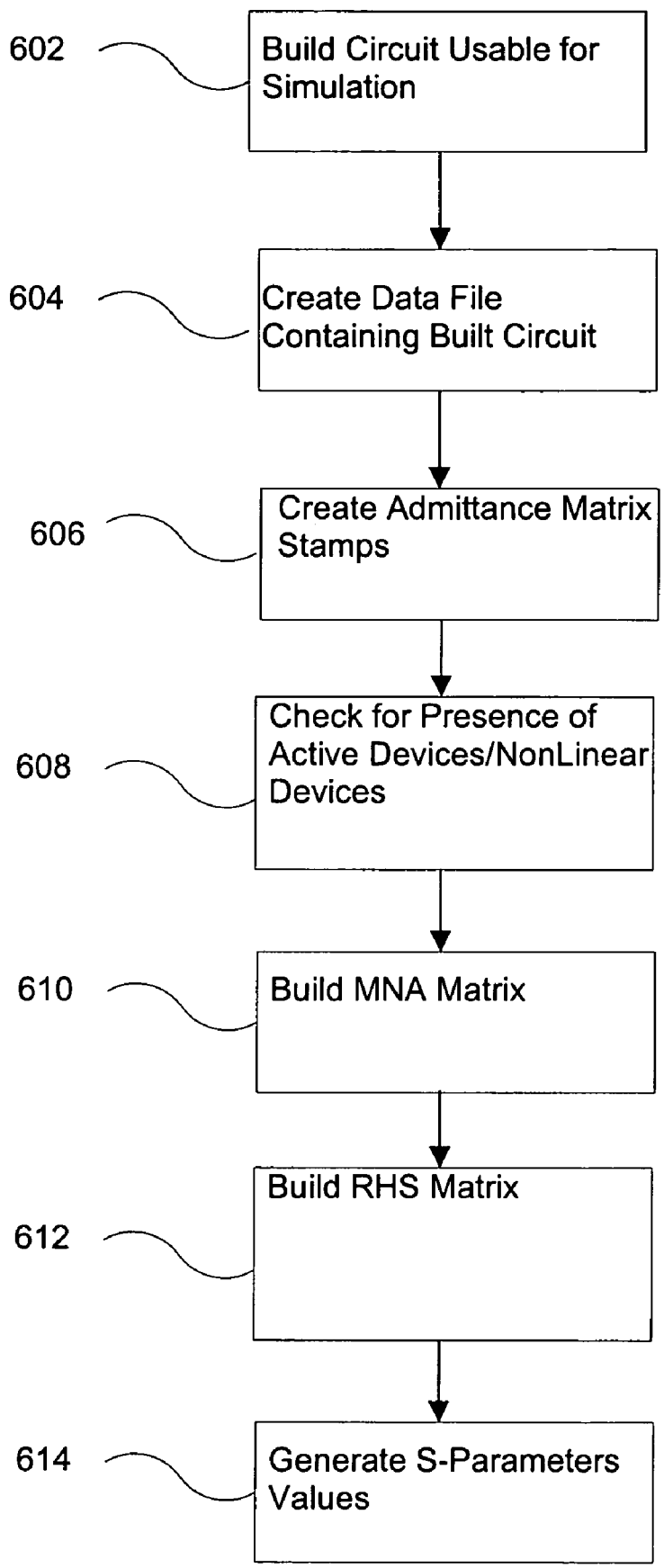
FIG. 7 shows a flow diagram of a process for generating s-parameters according to some embodiments of the invention.

FIG. 7 shows a flowchart of a process for generating S-parameter values according to some embodiments of the invention. At 602, the process builds a circuit usable for simulation. This action translates figures and structures on the topology into a format that can be operated upon by a simulator, e.g., the Spice simulator product. Any conventional or suitable approach can be taken to build this circuit. In one embodiment when used with a Spice simulator, this action converts pictures, library data, etc. into the Spice language or eSpice language, which is an extension of the spice language. The specifications for the eSpice language are available from Cadence Design Systems, Inc. of San Jose, Calif.

At 604, a data file is created that contains the built circuit. The data file contains control statements to perform the S-parameter generation process. The control statements are used to specify the user selected input for the creation of the model. The following is an example of a control statement that can be used in embodiments of the invention:

.sp SweepType NumberOfPoints StartFreq EndFreq ports=[p1 p2] R=50

This control statement specifies the type of sweep, start frequency, end frequency and number of frequency points to be swept.

The "SweepType" item refers to types of sweeps that can be performed, e.g., "lin" (Linear) or "log" (Logarithmic) sweep types. The "Number of Points" item is used to determine how many frequency points are required in the model. In some embodiments, this value cannot be "0". The "StartFreq" and "EndFreq" items are the Start and Stop frequencies of the model (StartFreq<EndFreq).

The "ports=[ ]" item specifies the Circuit Nodes that will be used as network terminals (ports) for the generated model. The order in which the ports are specified will determine the terminal number that will be assigned to that port. Each port name will be output as a single terminal. If the same port name is found again in the ports definition, it will be ignored.

The items "p1" and "p2" refer to Espice circuit nodes. In some embodiments, "e.g ports=[p1 p2 p1]" is the same as "ports=[p1 p2]" where p1 is the first port of the model and p2 is the second port. The "R=50" item refers to an optional reference impedance specification. In some embodiment, if this item is not specified, it is defaulted to 50 Ohms.

The following statement may also be used: ".node_param p1 name=PORT1". This statement is used to label an ESPICE node with an external label. This label may be used to assign names to external terminal of the model for the purpose of identification.

Referring back to FIG. 7, an admittance matrix stamp is created for circuit elements, e.g., relative to Y matrices and Y parameters (606). It is noted that the circuit elements may be actual elements, S-Parameter black boxes, or structures containing nested S-Parameter black boxes.

At 608, a determination is made for the presence of active/non-linear devices. This action can be performed by applying 0V to voltage sources (e.g., shorting voltage sources) and applying OA to current sources (opening current sources). In one embodiment, S-parameters are generated for only passive linear networks, and therefore the process ends if any active or non-linear devices are detected. In alternate embodiments, S-parameters may be generated for both passive linear networks as well as those containing active/non-linear devices.

At 610, a MNA Matrix (modified nodal analysis matrix) is built. This matrix is mapped to all nodes, with the number of nodes mapped accordingly. Stamps are fixed in the MNA matrix. At 612, a RHS matrix (right hand side matrix) is built. This matrix contains port information corresponding to the design.

Once the matrices have been built, the process proceeds by solving the MNA versus the RHS matrices. The current and voltage information can be generated form solving these equations.

A feature of some embodiments that should be noted is that the pre-building can be performed only once, and then surrounding values are changed for the analysis. This is contrast to conventional approaches in which the circuit must be built over and over again for each analysis.

S-parameter Output Formats

As noted above, S-parameters can be generated in the TouchStone format, DML format or both. In the TouchStone format, the Espice node and port label for the given port are written out. This is for the user to identify the port using an assigned name apart from the E-Spice node. In one embodiment, if a label was not assigned to a particular port in the espice file, the port label name is the same as the espice node name.

In the DML format, X calling statement is formed using the port label for the given port. If the port does not have a user specified label, the Espice Node Name is used in the calling statement. This direct mapping of the Port Label or the Espice Node with the S-parameter ports may be used to automatically load the model on the canvas for a particular topology.

FIG. 8 shows an example of a 4 port S-parameters in TouchStone and DML Format as generated for 1 frequency points. Section 802 of the example identifies the model name. Section 804 contains text that includes the espice subcircuit statement(s).

Section 806 includes information regarding ports. The outer subcircuit would have a map of ports that are defined. Section 808 calls another subcircuit in the inner subcircuit. This section is somewhat analogous to the touchstoner model file because it does not have a direct map of the ports. Instead, the mapping is based upon prior statement(s).

Section 810 identifies the information for the 4 by 4 matrix associated with the s-parameters. Section 812 identifies the pin connections. In some embodiments, the pin connections are handled automatically by auto-mapping the pins. Therefore, a node can be mapped to any particular pin in the design. The auto pin mapping is based on the pin-map present in the device model containing a one-to-one map of each pin and it's connections. This action forms the basis of how black box substitutions are performed.

What has been described is an improved method and system for generating s-parameters. The approach can be easily integrated with physical layout tools to automatically generate s-parameters. In addition, when required s-parameter (ex. transmission) characteristics are met, can directly capture topological constraint to drive physical layout, all in same unified environment A novel approach for implementing s-parameter black boxes substitutes has also been described. Embodiments provide association of physical topology description with models as well as the ability to go back and forth from mathematical s-parameter models to physical topology. In addition, characterization of nested s-parameter models can be generated for a topology containing other s-parameter models. The approach also provides the ability to quickly iterate on what-ifs; changing physical parameters and displaying new results.

System Architecture Overview

Figure 9:
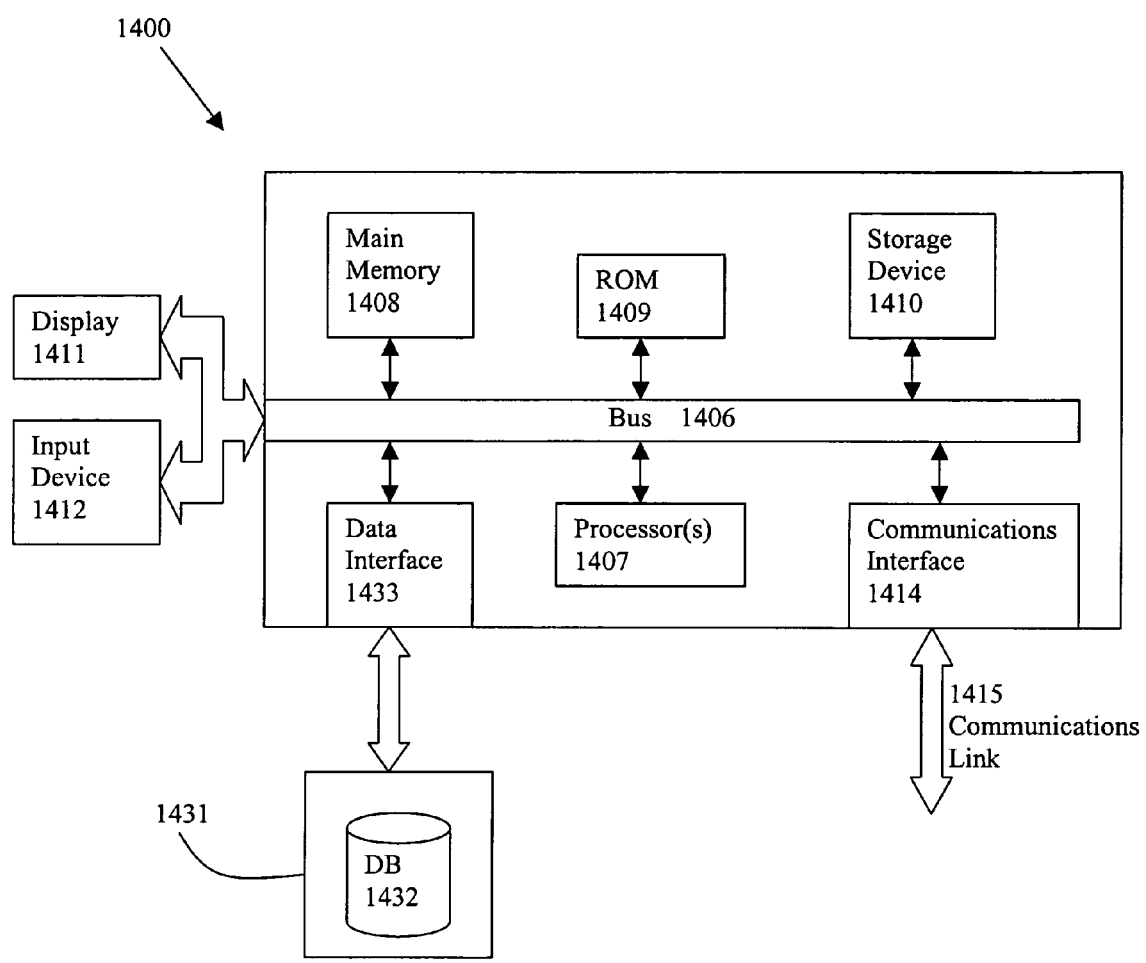
FIG. 9 illustrates an example computing architecture with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for generating scattering parameters corresponding to a circuit design, comprising:
   loading a topology of the circuit design;
   defining or updating preferences for a scattering parameter port based at least in part upon the topology of the circuit design;
   substituting at least a portion of the circuit design with a single topology element, wherein the single topology element comprises a scattering parameter black box;
   determining a degree of accuracy between the at least a portion of the circuit design and the signal topology element;
   automatically generating a scattering parameter model based at least in part upon the preferences and the single topology element;
   analyzing the circuit design based upon the scattering parameter model; and
   displaying a result of the analyzing action or storing the result of the analyzing action in a tangible medium.

2. The method of claim 1 in which the scattering parameters are generated in a model format.

3. The method of claim 2 in which the model format comprises touchstone format or Device Model Language (DML) format.

4. The method of claim 2 in which an original topology is restored.

5. The method of claim 1 in which the scattering parameter black box is nested within another scattering parameter model.

6. The method of claim 1 in which the degree of accuracy is automatically checked for sufficiency to determine whether the black box model is adequate.

7. The method of claim 6 in which a determination of insufficient accuracy results in adjustment of parameters and a re-generation of the scattering parameter black box.

8. The method of claim 1 in which the determination is made automatically by checking for threshold levels of correlation.

9. A computer program product comprising a computer usable medium having executable code to execute a process for generating s-parameters corresponding to a circuit designs, the process comprising:
   loading a topology of the circuit design;
   defining or updating preferences for a scattering parameter port based at least in part upon the topology of the circuit design;
   substituting a portion of the circuit design with a single topology element, wherein the single topology element comprises a scattering parameter black box;
   determining a degree of accuracy between the at least a portion of the circuit design and the signal topology element;
   automatically generating a scattering parameter model based at least in part upon the preferences and the single topology element;
   analyzing the circuit design based upon the scattering parameters model; and
   displaying a result of the analyzing action or storing the result of the analyzing action in a tangible medium.

10. The computer program product of claim 9, in which the scattering parameter black box is nested within another scattering parameter model.

11. The computer program product of claim 9, in which the process further comprises:
    determining whether the scattering parameter black box model is adequate by determining the degree of accuracy.

12. The computer program product of claim 11, in which the process further comprises:
    regenerating the scattering parameter black box by adjusting one or more parameters, in which the degree of accuracy is determined not to be adequate.

13. A system for generating scattering parameters corresponding to a circuit design, comprising:
    means for loading a topology of the circuit design;
    means for defining or updating preferences for a scattering parameter port based at least in part upon the topology of the circuit design;
    means for substituting a portion of the circuit design with a single topology element, wherein the single topology element comprises a scattering parameter black box;
    determining a degree of accuracy between the at least a portion of the circuit design and the signal topology element;
    means for automatically generating a scattering parameter model based at least in part upon the preferences and the single topology element;
    means for analyzing the circuit design based upon the scattering parameter model; and
    means for displaying a result of the analyzing action or storing the result of the analyzing action in a tangible medium.

14. The system of claim 13, in which the scattering parameter black box is nested with another scattering parameter model.

15. The system of claim 13, further comprising:
    means for determining whether the scattering parameter black box model is adequate by determining the degree of accuracy.

16. The system of claim 15, further comprising:
    means for regenerating the scattering parameter black box by adjusting one or more parameters, in which the degree of accuracy is determined not to be adequate.

* * * * *